United States Patent Office 2,940,487
Patented June 14, 1960

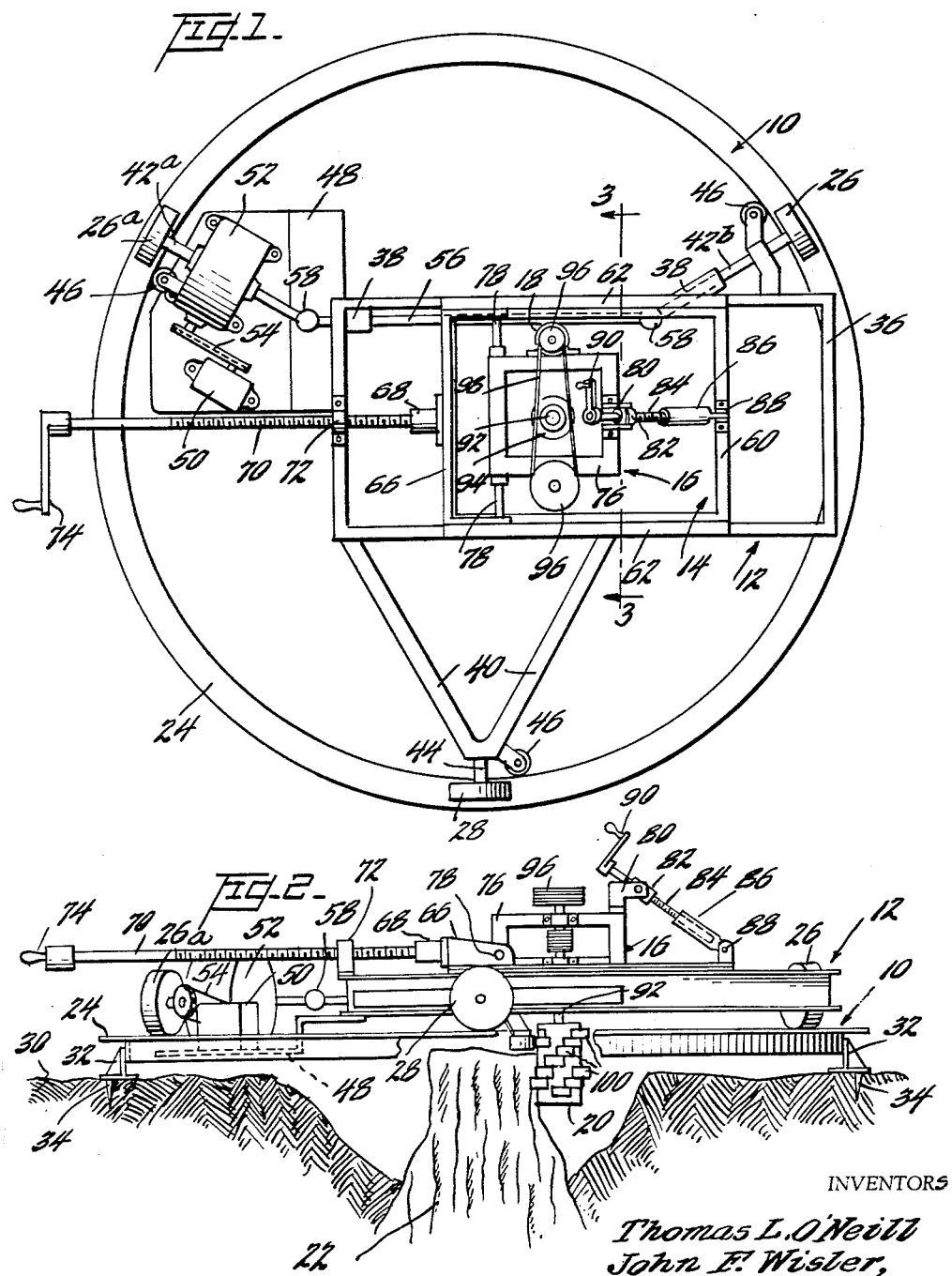

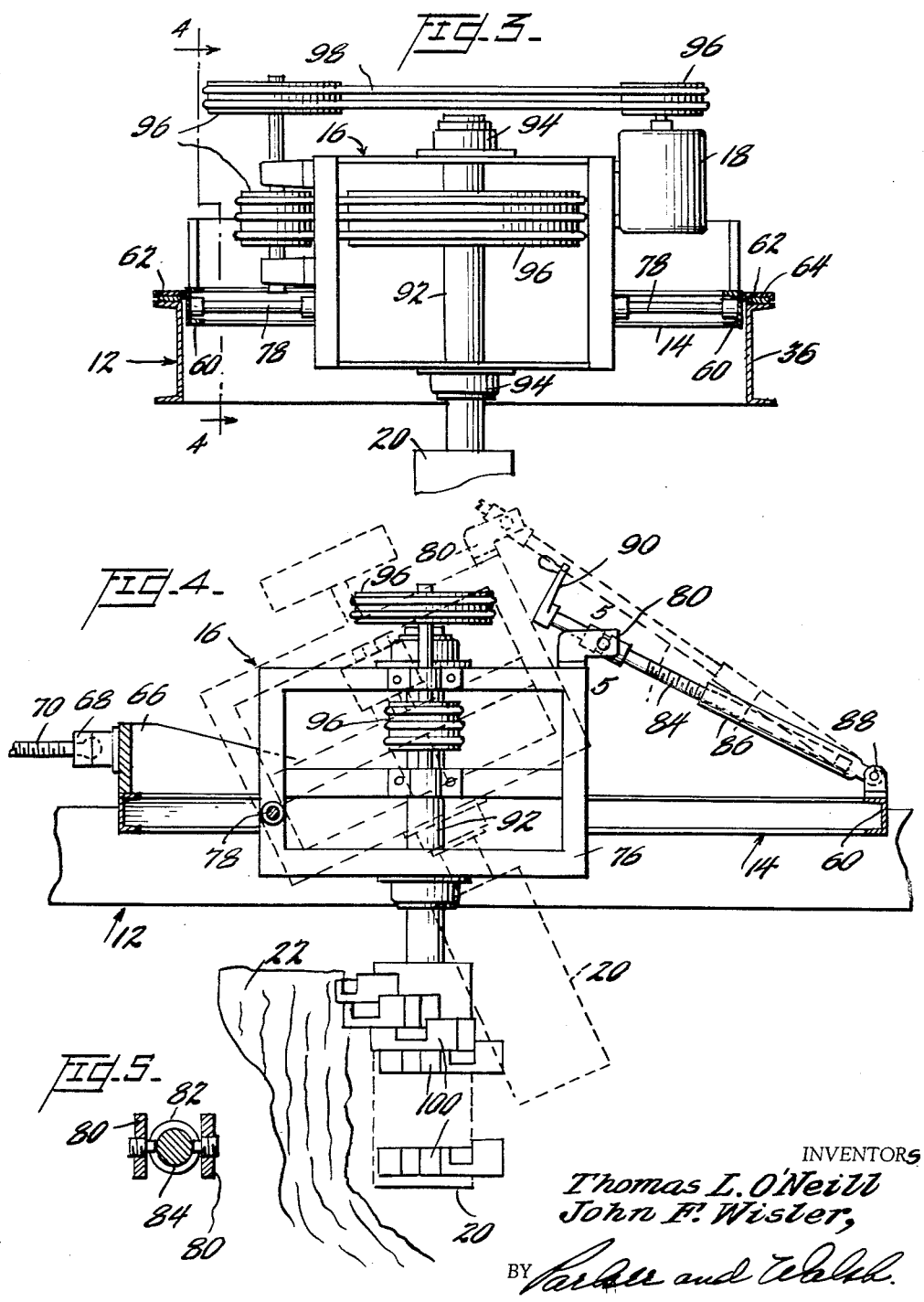

2,940,487
DISINTEGRATING DEVICE

Thomas L. O'Neill, 310 E. Brady St., Champaign, Ill., and John F. Wisler, Rte. 1, Sturgis, Mich.; said Wisler assignor to said O'Neill Filed May 12, 1958, Ser. No. 734,610

7 Claims. (Cl. 144—2)

This invention relates to a device for disintegrating stumps.

When a tree is cut down, it is frequently desired to remove a substantial part of the stump thereof either to permit a new planting, merely to clear the site, or for other purposes. Occasionally, the tree may be sufficiently decayed so that a vigorous fire will remove a substantial amount of the remaining stump. However, if the tree has been flourishing, the wood will be too green to burn. Furthermore, it is frequently undesirable to have a fire burning at the specific location of the stump. Most of the chemical reagents proposed for use in accelerating the decay of stumps, are of little value and none of them is immediately effective.

Physical removal, such as by bulldozing, is highly disruptive, disturbing the surrounding ground in a circle twenty-five or more feet about the location of the stump. By hand excavation to a depth of several feet and in a circle from three to ten feet around the stump, followed by extensive use of the ax, the main body of the stump may be removed but at excessive cost of hand labor.

The device of this invention may be used to reduce substantially all of the stump to small chips, easily removed or capable of being admixed with the soil for rapid decay and of such small size that they can be easily handled as a part of the soil. In the practical embodiment already constructed, stumps several feet in diameter can be dealt with, the apparatus being relatively smaller and lighter than a bulldozer-equipped tractor suited for removing stumps of corresponding size. For dealing with larger stumps, the saving in size and weight would be even more advantageous.

The device is preferably constructed to be carried upon a small trailer to be pulled by any suitable motor vehicle. A rotating, toothed cutting head is mounted within the apparatus to pass repeatedly over the surface of the stump removing portions of the stump at each pass in the form of chip-like cuttings.

For a more particular description of the preferred embodiment of the invention, reference is made to the accompanying drawings wherein:

Figure 1 is a plan view of the apparatus in operative position, all to a greatly reduced scale;

Figure 2 is an elevation corresponding to Figure 1, parts being broken away to provide a better view of the remaining parts;

Figure 3 is an enlarged partial view part in section along the line 3—3 of Figure 1;

Figure 4 is a partial view taken at right angles to Figure 3 along the lines 4—4 of Figure 3; and Figure 5 is a detail section taken along the lines 5—5 of Figure 4.

The preferred embodiment of the invention, as shown in the aforementioned drawings includes an outer, ground-engaging, ring-like track 10 having a carriage 12 mounted for travel about the track, within the ring. A sliding frame 14 is mounted on the carriage for movement from side to side, as viewed in Figure 1. In turn, a tilting frame 16 is mounted on the sliding frame, the tilting movement being best shown in Figure 4. The tilting frame supports a cutter drive motor 18 and the cutter head 20 for contact with the stump 22. The cutter head 20 is so mounted that, with its axis arranged vertically, it extends from a point several inches above ground to another point, well below the ground level, as low as it is desired to remove the wood of the stump.

The track 10 is formed of angle or channel-shaped cross-section to provide a flat top surface for wheels 26, 28 to travel upon. If desired, the track 10 may be made up of two or more sections for ease in transportation. Conveniently, the apparatus may be partially dismantled for transportation, the ring 10 constituting one portion and the remainder of the apparatus, one or more additional sections.

In such case, the apparatus will be brought to the site of a felled tree in a vehicle suitably prepared for carrying the same in parts. While the apparatus is adaptable to deal with any form of stump, it is usually most convenient to have the stump cut as close to the ground as possible. The ring 10 is set out on the ground surface 30 around the stump 22 with the stump approximately centered within the ring. By means of pieces of wood found at the site, the ring is arranged with its upper surface 24 substantially level. It is obvious that in some circumstances, portions of the ground surface 30 may be dug away to facilitate the leveling operation. A series of brackets 32 spaced about the periphery of ring 10 are anchored to the ground 30 by means of pegs 34 driven through the ground contacting portions of the brackets 32. Alternatively, the ring 10 may constitute a portion of the frame of a vehicle driven to the site of the stump to be removed and the frame may be suitably lowered to the ground-engaging position.

The carriage 12 is made up of a central box frame of channels 36 welded together having a pair of laterally extending, angularly disposed journals 38 and a pair of outriggers 40 attached thereto. The journals 38 house shafts 42b carrying one of the wheels 26, and 56, which with shaft 42a, carries wheel 26a while, at the apex of outriggers 40, the stub-shaft 44 carries idler wheel 28, whereby the frame 12 is supported upon the wheels 26, 26a and 28 for movement around the track surface 24. A set of caster wheels 46, suitably mounted on brackets, press outwardly against the inner wall of the ring 10 to reduce sidewise movement.

Upon one end of the carriage 12 is mounted plate 48 for supporting motor 50 and reduction gear 52, linked together by chain drive 54. The shaft 42a may be driven directly from the reduction gear 52 while the shaft 42b is driven through the shaft 56 equipped with universal joints 58. The motor 50 is preferably driven by hydraulic fluid supplied from a motor-pump combination mounted on the transporting vehicle but it is obvious that a separately driven motor may be used instead.

The sliding frame 14 is an open box frame made up of a set of inwardly facing channels 60, having a pair of outwardly extending flanges 62 secured thereto for supporting a series of rollers 64 to ride upon the upper flanges of channels 36.

A bracket 66 upstanding from the rear of frame 14 (at left of Figures 1 and 4) serves as a mounting for the yoke and pin structure 68 to which the inner end of lead screw 70 is connected. The screw 70 passes through a nut 72 fixed to the carriage 12 and is operated by crank 74. The screw 70 extends along one diametral axis of the carriage 12 with relationship to the ring 10 and serves to bring that portion of the apparatus mounted on the sliding frame 14 inwardly from the periphery of the ring to the central axis of the stump.

The tilting frame 16 is made up of an appropriate group of angles and plates 76 welded together and rockably mounted by means of shafts 78 upon the sliding frame 14. A pair of outwardly extending lugs 80 form a yoke for mounting ring 82 through which srew shaft 84 passes. The screw shaft 84 moves in internally threaded tube 86 pivotally mounted at 88 at the front of sliding frame 14. By turning the crank 90, the frame 16 may be rocked on the shafts 78 to swing the cutting head from a vertical position as shown in full lines in Figures 4 to an angular position as shown in dash lines in the same figure. The cutting head 20 may be brought from an angular position as shown in the dash lines of Figure 4 initially to the vertical position for the later stages of cutting.

The cutting head 20 is mounted on shaft 92 supported in bearings 94 forming part of the frame 16. The shaft 92 is driven from the motor 18 by a series of pulleys 96 and the belts 98. The motor may appropriately be driven from the same hydraulic supply as motor 50.

In operation, after the tree has been felled leaving the cut surface of the stump slightly above the ground and, with the trunk removed some distance from the stump, the ring track is set upon the ground with the center of the stump as the approximate center of the ring. Using the odd pieces of wood available at the site for leveling the surface 24 of the ring, the pegs 34 are driven into the ground to firmly seat and locate the ring with respect to the stump. Such earth as can be removed adjacent the stump, to a depth of about one foot and in a ring about one foot out from the stump, may be removed but inability to remove such earth will not greatly hinder the operation of the apparatus.

Before lowering the carriage and the elements supported thereon onto the ring, the tilting frame 16 will be moved to a position similar to that shown in the dash line portion of Figure 4 or it may be tilted beyond to angle of as much as 45°. The sliding frame will be moved as far toward the outside of the ring as is necessary for the cutting head 20 to clear the stump 22.

Using cranks 74 and 90, the cutting head 20 having teeth 100 similar to those of a side milling cutter arranged in spiral order about the head 20, is brought barely into contact with that portion of the stump extending radially outward closest to the ring. Motor 18 is first started to put the cutting head into rotation and then motor 50 is started to cause the cutting head to encircle the stump, the two wheels 26 driving the entire carriage to cause the cutting head to move in a circular path about the stump while wheel 28 merely supports the carriage as it travels around. Depending upon the nature of the stump being cut, the cutting head may be left at any suitable angle to the vertical from 45° to the vertical position itself. Turning of the crank 74, as the carriage proceeds around the ring will cause the teeth of the cutting head to bite, in successive depth, into the stump until little of the heart of the stump remains, as the cutting head reaches approximately the center of the ring. It is usually advantageous to leave a center core of a few inches diameter which may be sawed off. If desired, means may be provided for turning the screw 70 automatically to feed the cutting head into the stump.

The device of this invention is especially well suited to the purpose for which it is intended. The adjustable screw for feeding the cutter into the stump allows the feeding to take place at a rate dependent upon the texture of the wood of the stump being removed. Additionally, the rate of rotation about the stump may be adjusted to suit the conditions encountered. The device is easily transported to the location of the stump and requires only a short time for setting up. When once put into operation, it completes the job rapidly and effectively. The individual teeth of the cutter may be separately removed for sharpening or replacement.

As has been indicated, the device is susceptible of numerous modifications; other modifications will be obvious to the skilled mechanic. Accordingly, the foregoing description is to be taken as exemplary only, the invention being defined in the claims that follow.

We claim:

1. A device for disintegrating stumps comprising a circular track, means for fixedly engaging the track directly with the earth surrounding the stump to be worked upon in generally concentric relation thereto and in a manner to support the entire weight of the device on the ground, a carriage, means on said carriage for supporting it on and driving it about said track, within the circumference thereof, a cutting member mounted to project below the carriage for rotation about a vertical axis and means on said carriage for supporting the cutting member mounting for horizontal movement, radially of said circular track, all arranged so that, as the cutter is rotated and as its axis of rotation is moved inwardly along a radius of the track circle and as the axis of rotation is moved along the circumference of a circle concentric with the track circle through travel of the carriage on the track, the cutter will disintegrate the stump.

2. Apparatus as in claim 1 including means for tilting the axis of rotation of the cutter so that the cutter may be swung outwardly and upwardly with respect to the vertical axis of the track circle, and means for adjusting the angle of tilting.

3. Apparatus as in claim 1 wherein the cutting circle of the cutting head is relatively smaller in diameter than the stump to be removed.

4. The device of claim 1 wherein the circular track is provided with horizontally extending members for ground contact and stakes are employed to secure said members to the ground.

5. Apparatus as in claim 1 wherein the cutter head is provided with a plurality of cutting teeth spaced both radially and axially upon the head.

6. Apparatus as in claim 5 wherein the teeth are arranged spirally about the cutter.

7. A device for disintegrating stumps including a wheel-supporting track, means for temporarily fixing said track solely upon the earth and in a manner to support the entire weight of the device on the ground, including associated means for fixing the track substantially level, a carriage, wheels mounted on and extending outwardly of such carriage for supporting said carriage for movement along said track, a cutter head mounted to project below the carriage for rotation about a vertical axis, including cutting teeth extending outwardly from said head, means for supporting and driving said cutter and means for mounting said supporting means for longitudinal movement on said carriage including means for adjustably advancing said supporting means in its longitudinal movement, whereby, as the carriage is driven along the track and as the cutter is rotated, the supporting means may be advanced along the carriage to bring the cutter into engagement with the stump and thereafter said supporting means may be successively advanced by further increments with each recurrent movement of the carriage to take further cuts on the stump as the cutter is carried past the stump.

References Cited in the file of this patent

UNITED STATES PATENTS

| 15,178 | Ehrsam | June 24, 1856 |
| 894,889 | Johnson | Aug. 4, 1908 |
| 1,012,962 | Anderson | Dec. 26, 1911 |
| 1,286,569 | Fauser | Dec. 3, 1918 |
| 1,326,713 | Dean | Dec. 30, 1919 |
| 1,638,086 | Carter | Aug. 9, 1927 |
| 2,671,478 | Anderson et al. | Mar. 9, 1954 |
| 2,825,370 | Feiber | Mar. 4, 1958 |

FOREIGN PATENTS

| 267,755 | Switzerland | July 1, 1950 |

OTHER REFERENCES

"Popular Science," October 1949, page 113. (Copy in Patent Office Library.)